United States Patent [19]

Nakagawa

[11] 4,000,126

[45] Dec. 28, 1976

[54] TRANSLUCENT FILM AND METHOD FOR MANUFACTURING THE SAME

[75] Inventor: Tsutomu Nakagawa, Musashino, Japan

[73] Assignee: Agency of Industrial Science & Technology, Tokyo, Japan

[22] Filed: Mar. 31, 1975

[21] Appl. No.: 563,513

[30] Foreign Application Priority Data

June 27, 1974 Japan .............................. 49-73717

[52] U.S. Cl. ...................... 536/68; 210/500 M; 427/161; 536/69

[51] Int. Cl.² .......................................... C08B 3/06

[58] Field of Search ............ 260/227, 229; 427/161

[56] References Cited

UNITED STATES PATENTS

| | | | |
|---|---|---|---|
| 2,036,947 | 4/1936 | McKee et al. ..................... | 260/230 |
| 2,772,944 | 12/1956 | Allewelt ............................ | 260/229 |
| 2,773,865 | 11/1956 | Purchase .......................... | 260/229 |
| 2,778,820 | 1/1957 | Clevy et al. ....................... | 260/229 |
| 2,790,794 | 4/1957 | Malm et al. ....................... | 260/229 |
| 2,854,446 | 9/1958 | Robin et al. ...................... | 260/229 |
| 3,290,286 | 12/1966 | Kesting ............................. | 260/230 |
| 3,497,072 | 2/1970 | Cannon ............................ | 106/196 |
| 3,631,023 | 12/1971 | Horne et al. ...................... | 260/229 |
| 3,671,516 | 6/1972 | Hillman et al. ................... | 260/229 |

*Primary Examiner*—Ronald W. Griffin
*Attorney, Agent, or Firm*—Kurt Kelman

[57] ABSTRACT

A translucent film having good water permeability and having dissociating power with respect to metallic ions is produced by subjecting one side of a cellulose film to acetylation treatment so as to highly acetylate said one side while leaving the other side unacetylated.

4 Claims, No Drawings

TRANSLUCENT FILM AND METHOD FOR MANUFACTURING THE SAME

BACKGROUND OF THE INVENTION

The present invention relates to a method for the manufacture of a translucent film of good water permeability having dissociating power with respect to metallic ions and the translucent film manufactured by this method. More particularly, the present invention relates to a method for manufacturing translucent film of good water permeability, comprising a region extending inward from the face thereof of highly acetylated cellulose, a region extending inward from the back thereof of cellulose, and an intermediate region of acetylated cellulose the degree of acetylation of which decreases in the direction of from face to back. The dissociating power with respect to metallic ions of the translucent film derives from said highly acetylated region and the cellulose region serves as a supporting base and gives characteristic strength to the product.

As well-known to the art, acetylated cellulose possesses selectivity toward metallic ions. However, it is also known that homogenously acetylated film is of extremely low water permeability and unsuitable for practical application.

Attempts have been made to obtain higher water permeability. For example, an acetylated cellulose translucent film manufactured by the method disclosed in the Japanese Patent Application No. 42-2818(1967) is known. This method is one wherein a cellulose derivative and water soluble liquid amide dissolved in an organic solvent, the solution thus obtained is cast into the form of a film, a portion of the organic solvent is evaporated for a specified period, the film is immersed in water and thereafter heated to reduce its porosity.

As apparent from the above manufacturing method, the film is composed of a thin top layer which has dissociating power and obtained by evaporating a part of the organic solvent for a specified period and a porous support is obtained by immersion in water. This method is aimed at obtaining higher water permeability by making the top layer with dissociating power as thin as possible.

However, the translucent film thus produced has various drawbacks. First, the support upon which the translucent film relies for mechanical strength is porous so that the film as a whole has extremely low strength. Second, in the metallic ion dissociation process it is generally necessary to apply a pressure higher than ordinary osmotic pressure and so in use the pores of the support have a tendency to be pressed shut causing a reduction in the water flow rate during extended service.

Third, the top layer and the support are essentially of different structure, i.e., the former is a homogenous film and the latter is a porous film.

Thus, the films cannot be dried and must ordinarily be stored in the wet condition. Fourth, since the translucent film is formed by casting, there is a danger that foreign substances present in the cast solution will result in undesirable pinholes which reduce the dissociating power of the film with respect to metallic ions.

Also known to the art is a method wherein an extremely thin acetylated cellulose film is directly cast over a porous film in an attempt to obtain higher water permeability.

However, the same problems mentioned above remain since the support is a porous film.

One object of the present invention is to provide a method for manufacturing a translucent film of great strength, good dissociating power with respect to metallic ions and good water permeability.

Another object of the present invention is to provide a translucent film of great strength, good dissociating power with respect to metallic ions and good water permeability.

BRIEF SUMMARY OF THE INVENTION

To accomplish the above objectives of the present invention, a cellulose film is first swollen with water, the swollen film is then immersed in acetic acid to replace the water with acetic acid, one side of the film is further immersed in a mixture comprised of an organic solvent which does not dissolve acetylated cellulose and acetic anhydride and containing sulfuric acid as a catalyst. By this means, a region extending inward from one side of the cellulose film is changed to highly acetylated cellulose, a region extending inward from the other side of the cellulose film remains an unacetylated cellulose, and the intermediate region between the first and second regions is changed to acetylated cellulose the degree of acetylation of which decreases in the direction of one side to said other side.

The film thus produced is translucent, has a region of acetylated cellulose on its face side, and a supporting region of cellulose on its back side and is possessed of metallic ion dissociating power and high water permeability.

DETAILED DESCRIPTION OF THE INVENTION

The translucent film having good water permeability in accordance with the present invention is composed of a homogenous cellulose region having high strength and serving as support and an acetylated cellulose top region produced from cellulose by a chemical process. As the homogenous cellulose region of the film serves as a support, the overall strength of the translucent film is extremely high so that when used in a metallic ion dissociation process, no drop in flow rate occurs even under the application of high pressure. In addition, since the top region is produced by the acetylation of a part of the same cellulose film as forms the support and further since the intermediate region of the film varies in degree of acetylation in proportion to the distance from the face, drying has no effect upon the performance of the film itself.

Furthermore, the manufacturing method of the translucent film according to the present invention completely excludes the possibility of creating pinholes, etc.

The translucent film of the present invention not only provides a solution to problems involved in conventional films but also possesses outstanding additional advantages. For example, by properly selecting the degree of acetylation, this invention makes it possible to control the ion dissociation power of the film produced.

The manufacturing method of the translucent film according to the present invention will now be described.

In one preferred embodiment of the method for manufacturing the translucent film according to the present invention, the cellulose film is acetylated while being maintained in its initial form.

The above will be explained in detail. The cellulose film is first swelled with water and then immersed in acetic acid solution to replace water with acetic acid.

Subsequently, the film is reacted in the presence of a catalyst with the acetate anhydride contained in the organic solvent. The degree of acetylation is not uniform throughout the depth of the film but is greatest near the face of the film and decreases progressively toward the back.

Since the top layer of acetylated cellulose thus produced would normally into the acetate anhydride, the addition of the organic solvent is essential.

For the cellulose film, commercial cellophane and deacetylated cellulose diacetate and triacetate can be used in the form of film, sheet or hollow fiber.

Any organic solvent can be used in the reaction so long as it will not dissolve the acetylated cellulose. Examples of organic solvents which can be used include aromatic hydrocarbons, halogenated hydrocarbons, ketones, aldehydes, etc.

The percentage by weight of each component in the mixture of acetate anhydride, organic solvent and sulfuric acid catalyst used in the present invention is: acetate anhydride 10–20%, organic solvent 79–89.9%, sulfuric acid 0.1–1%.

If the percentage of sulfuric acid exceeds the upper limit, there is a danger that the molecules of the cellulose film may be severed. A percentage of acetate anhydride higher than the upper limit causes the reacted portion of the cellulose film to dissolve.

When sulfuric acid is contained at less than the lower limit no reaction will take place, and when acetate anhydride is contained at less than the lower limit the reaction will become too small.

The thickness of the cellulose film used varies depending upon the application to which it is to be put. Preferably, however, the film should have a thickness in the range of 0.01–0.1 mm for practical application. Thinner films are susceptible to pinhole formation and to breakage under pressure. Thicker films suffer from reduced permeability. Preferred reaction temperature is 0°–100° C and reaction time is 10–300 min. The translucent film thus obtained may be annealed for stabilization of dissociating power by boiling in aqueous solution.

The structure of the translucent film produced by the method according to the present invention basically consists of a region of highly acetylated cellulose extending inward from the face thereof, a region of cellulose extending inward from the back thereof and serving as the base material, and an intermediate region of a acetylated cellulose the degree of acetylation of which decreases in the direction from the face to the back side. The film of this construction possesses dissociating power with respect to metallic ions and is of good water permeability.

Although the values vary with the reaction conditions, dissociating power of 1% salt solution is usually around 50–95%, the rate of water permeation at such time being 0.4–2.0l/m$^2$/hr under a pressure of 80kg/cm$^2$.

EXAMPLE 1

Commercially available cellulose film (60μ thick) was immersed in water to be swollen. It was thereafter immersed in acetic acid solution to replace water therein with acetic acid. One side of the film thus swollen in acetic acid was brought into contact with a solution comprising 25g of acetate anhydride, 175g of benzene and 1.48g of sulfuric acid for three hours at room temperature for the purpose of causing acetylation. The translucent film thus obtained was subjected to a dissociating power test under a pressure of 80 kg/cm$^2$ using a 1% salt solution. The salt removal rate was 75.4% and the water flow rate was 1.01l/m$^2$hr.

EXAMPLE 2

A translucent film was produced under the same conditions as for Example 1 except that the reaction time was one hour. The salt removal rate of the translucent film obtained was 53.3% and the water flow rate at that time was 2.22l/m$^2$hr.

EXAMPLE 3

A cellulose film obtained by deacetylating cellulose triacetate film (100μ thick) was subjected to reaction for four hours using the same reaction solution as for Example 1. The salt removal rate of the translucent film obtained was 70.9% and the water flow rate was 1.23l/m$^2$hr.

EXAMPLE 4

The translucent film obtained in Example 3 was annealed in boiling water for five minutes. After annealing, the dissociating power was 90.1% and the water flow rate at that time was 0.86l/m$^2$hr. It was found that the performance of this film could be restored drying by immersion in water. A 24-hour continuous dissociation operation under a pressure of 80 kg/m$^2$ resulted in no conspicuous change except that the water flow rate was slightly lowered to 0.84l/m$^2$hr.

What is claimed is:

1. A method of manufacturing a translucent film of good water permeability and an ability to dissociate metallic ions, which comprises the steps of
   1. swelling a film of cellophane, deacetylated cellulose diacetate or deacetylated cellulose triacetate with water,
   2. immersing the water-swollen film in an acetic acid solution until the water in the film is replaced by the acetic acid throughout the film from an obverse side to a reverse side thereof, and
   3. contacting the obverse side of the film for 10 to 300 minutes and at a temperature from 0° to 100° C with an acetylating solution consisting of an organic solvent incapable of dissolving acetylated cellulose, acetic anhydride and a catalytic amount of sulfuric acid, the contact of the obverse film side being maintained to permit gradual and progressively decreasing soaking of the film with the acetylating solution from the obverse to the reverse side whereby the degree of acetylation progressively decreases from the obverse to the reverse side, and the contact is terminated before the acetylating solution has reached the reverse side whereby the reverse side of the film is not acetylated, the degree of acetylation of the film decreasing gradually from the obverse to the reverse side.

2. Manufacturing method according to claim 1 wherein the thickness of the film is between 0.1 mm and 0.01 mm and the percentage by weight of each component of the acetylating solution is 0.1–1% of sulfuric acid, 79–89.9% of organic solvent and 10–20% of acetic anhydride.

3. Method according to claim 1 wherein the organic solvent is selected from the group consisting of aromatic hydrocarbons, aliphatic hydrocarbons, halogenated hydrocarbons, ketones and aldehydes.

4. A translucent cellulosic film of good water permeability and an ability to dissociate metallic ions, the film having an acetylated cellulose obverse side, a reverse side of cellophane, deacetylated cellulose diacetate or deacetylated cellulose triacetate, and an intermediate region between the obverse and reverse sides, the intermediate film region consisting of a layer of acetylated cellulose whose degree of acetylation decreases gradually from the obverse to the reverse side.

* * * * *